US008750147B2

(12) United States Patent
Iwaya et al.

(10) Patent No.: US 8,750,147 B2
(45) Date of Patent: Jun. 10, 2014

(54) INFORMATION PROCESSING DEVICE FOR DETERMINING RELATED FILES FOR DOWNLOAD

(75) Inventors: Akiko Iwaya, Kanagawa (JP); Shinichi Tanaka, Kanagawa (JP); Yasutaka Miwa, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 424 days.

(21) Appl. No.: 13/117,820

(22) Filed: May 27, 2011

(65) Prior Publication Data
US 2011/0307582 A1 Dec. 15, 2011

(30) Foreign Application Priority Data
Jun. 11, 2010 (JP) ................................ 2010-134425

(51) Int. Cl.
H04L 12/28 (2006.01)
H04J 1/16 (2006.01)

(52) U.S. Cl.
USPC ............................ 370/252; 370/412; 370/386

(58) Field of Classification Search
USPC .......................................... 370/252, 412, 386
See application file for complete search history.

(56) References Cited

U.S. PATENT DOCUMENTS

2008/0141018 A1    6/2008  Tanaka et al.
2008/0276300 A1*  11/2008  Terao ................................ 726/3
2009/0187901 A1    7/2009  Kanai
2011/0302124 A1*  12/2011  Cai et al. ......................... 706/52

FOREIGN PATENT DOCUMENTS

JP    2000222296 A    8/2000
JP    2003060646 A    2/2003
JP    2006202028 A    8/2006
JP    2007226740 A    9/2007
JP    2009104433 A    5/2009

OTHER PUBLICATIONS

Office Action for corresponding JP Application No. 2010-134425, dated Aug. 7, 2012.
"AppleScript for Mac OS 8.6, Thorough Verification of Its Practical Applications, Mac OS 8.6 Perfect Guide," (ASCII Corporation), pp. 121-123, Oct. 1, 1999.
Office Action for corresponding JP Application No. 2010-134425, dated May 8, 2012.

* cited by examiner

Primary Examiner — John Pezzlo
(74) Attorney, Agent, or Firm — Matthew B. Dernier, Esq.; Gibson & Dernier LLP

(57) ABSTRACT

An activation history storage stores an activation history of applications. A determination unit refers to the activation history and determines a file that is related to an application and that should be downloaded from a server. A processing unit downloads the determined related file. The activation history storage maintains an activation history that maps identification information identifying an application into the latest activation date and time of the application, and the determination unit refers to the activation date and time and determines the related file to be downloaded.

17 Claims, 9 Drawing Sheets

| STARTING DATE AND TIME | STARTED MODULE |
|---|---|
| 2010/6/11/2:00 | DOWNLOAD MODULE |
| 2010/6/11/3:00 | IMAGE RECORDING MODULE |

| TITLE ID | FLAG VALUE | DATE AND TIME OF INSTALLATION | NUMBER OF TIMES OF PLAY |
|---|---|---|---|
| ABC123 | 1 | 2010/5/10/2:30 | 0 |
| 456DEF | 0 | 2010/5/30/19:15 | 5 |
| GHI789 | 1 | 2010/5/10/2:50 | 1 |
| ⋮ | ⋮ | ⋮ | ⋮ |

| TITLE ID | LATEST ACTIVATION DATE AND TIME | PATCH VERSION INFORMATION |
|---|---|---|
| 456DEF | 2010/6/9/23:00 | ver.2 |
| XYZ135 | 2010/6/8/19:25 | ver.1 |
| ⋮ | ⋮ | ⋮ |

| TITLE ID | INSTALLED | PRODUCT VERSION IS INSTALLED | PRODUCT VERSION IS PLAYED |
|---|---|---|---|
| PQR987 | 1 | 0 | 0 |
| STU468 | 0 | 1 | 0 |
| ⋮ | ⋮ | ⋮ | ⋮ |

…

INFORMATION PROCESSING DEVICE FOR DETERMINING RELATED FILES FOR DOWNLOAD

BACKGROUND OF THE INVENTION

1. Field of the Invention

The present invention relates to technology used in an information processing device such as a game device.

2. Description of the Related Art

Generally, game software is distributed and sold on a ROM medium such as an optical disk, magneto-optical disk, blue ray disk, etc. Game software once recorded on a ROM medium cannot be rewritten. Correction of bugs, or modification or addition of a function of the game software is addressed by applying a patch. Patent document No. 1 discloses a game system where the game device maintains a list identifying game data on a ROM medium installed in a media drive in the past and periodically accesses an update server managing update to the game data included in the list to download patch files.

[patent document No. 1] US2008/0141018

In the game system disclosed in patent document No. 1, the game device periodically accesses the update server. Under certain circumstances (e.g., when the user is playing a game), however, it is not fit to download a patch file. Another concern is that downloading patch files for all games played in the past may not be desirable in respect of the storage capacity of the game device or network resources. For this reason, it is preferable to build a scheme for efficiently downloading a patch file desired by the user. It is preferable to include files of other types (e.g., system software or content files such as movie) in the scheme in addition to patch files.

SUMMARY OF THE INVENTION

In this background, a general purpose of the present invention is to provide a technology of efficiently downloading files from a server.

The information processing device addressing the issue comprises: a first storage configured to store an activation history of one or more applications; a determination unit configured to refer to the activation history and determine a file that is related to an application and that should be downloaded from a server; and a processing unit configured to download the determined related file.

Optional combinations of the aforementioned constituting elements, and implementations of the invention in the form of methods, apparatuses, systems, recording mediums and computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 8 shows an example of processing history stored in the processing history storage;

FIG. 9 shows an example of activation history stored in the activation history storage;

FIG. 10 shows an example of processing history stored in the processing history storage;

DETAILED DESCRIPTION OF THE INVENTION

The invention will now be described by reference to the preferred embodiments. This does not intend to limit the scope of the present invention, but to exemplify the invention.

A summary of the present invention will be given before describing the invention in specific detail. The information processing apparatus according to the embodiment is started by a timer at a preset time and accesses a file provider server automatically so as to download system software, patch files of games, or content files such as demonstration game software and game trailers (game videos). In this embodiment, such a function will be referred to as "automatic download function".

In order to cause an information processing device to perform the automatic download function, the user joins automatic download service and acquires an account ID. Although an expiration date is defined in the service account ID, the user can extend the expiration date. The information processing device can execute the automatic download function, if the service account ID is used before the expiration date. The user holds an ID (sign-in ID) for signing up for the service, and the sign-in ID may be used as a service account ID (described later). In this case, the user does not need to acquire a service account ID and should just tell the server that the user has subscribed to the automatic download service.

The information processing device refers to a history of starting or processing applications to determine a file expected to be needed by the user or useful for the user as being a target for downloading. The information processing device downloads the target file from the file provider server to a storage device such as a hard disk drive (HDD) or a flash memory, and installs the downloaded file. This eliminates the need for the user to download the file manually. By allowing the information processing device to perform the automatic download function, an environment is created in which the latest software is downloaded and available for use when the user tries to play a game. The inventive approach also creates an environment in which the latest patch file is applied to the game software.

Figure 1:
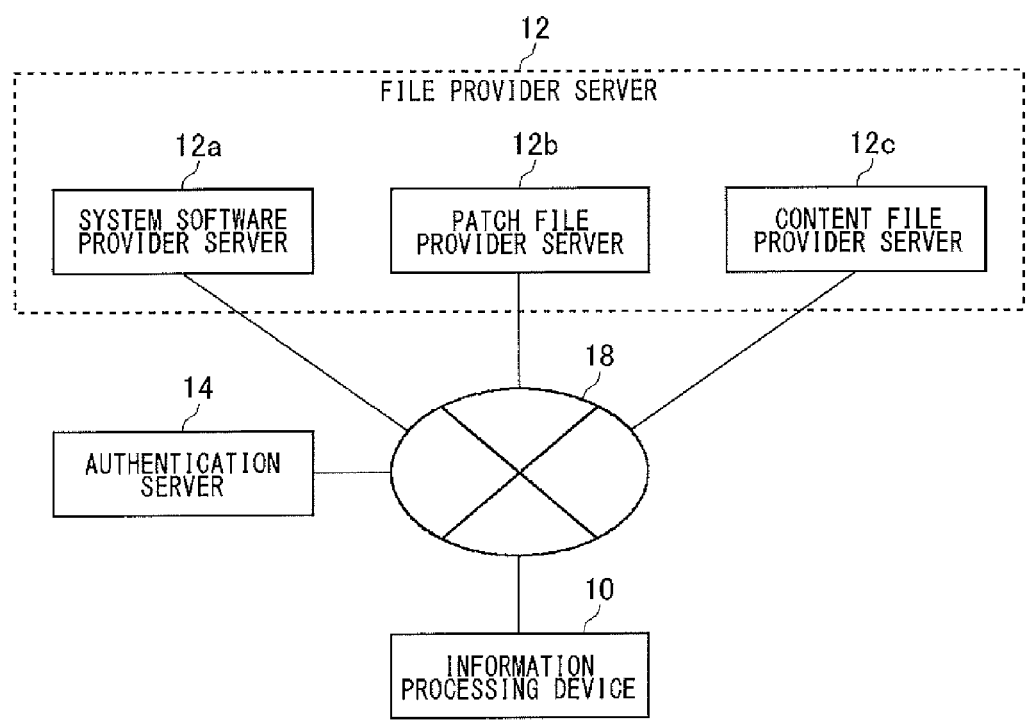
FIG. 1 shows an information processing system according to an embodiment of the present invention.

FIG. 1 shows an information processing system 1 according to the embodiment. The information processing system 1 comprises an information processing device 10 (user terminal), a file provider server 12, and an authentication server 14. The file provider server 12 comprises a system software provider server 12a for providing system software that builds an environment for the information processing device 10, a patch file provider server 12b for providing a patch file applied to game software, and a content file provider server 12c for providing content files such as demonstration software or game trailers. The information processing device 10, the system software provider server 12a, the patch file provider server 12b, the content file provider server 12c, and the authentication server 14 are connected so as to be able to communicate with each other via a network 18 such as the Internet.

In the information processing system 1, the system software provider server 12a, the patch file provider server 12b, and the content file provider server 12c are examples of the file provider server 12 which provides files to the information processing device 10. Each of the system software provider server 12a, the patch file provider server 12b, and the content file provider server 12c may comprise a single server or a plurality of servers. A combination of two or more of the system software provider server 12a, the patch file provider server 12b, and the content file provider server 12c may comprise one server.

The system software provider server 12a is managed by the management entity of the information processing system 1, and stores the newest system software that should be used to update the information processing device 10. In the information processing system 1, system software is classified into two types according to the importance of update. The two types are indicated below as the "first system software" and the "second system software."

The first system software is a type of system software that needs to be installed without fail in order for the information processing device 10 to use the network function so that the importance of update thereof is high. Unless the latest first system software is installed in the information processing device 10, the device 10 cannot be authenticated by the authentication server 14 and cannot sign in. The information processing device 10 can use the network function by installing the latest first system software.

The importance of update of the second system software is relatively low; the information processing device 10 can perform applications in the latest environment by installing the latest second system software. Even if the latest second system software is not installed in the information processing device 10, that does not affect authenticating process in the authentication server 14. For example, if the version of the latest second system software is newer than the version of the latest first system software, the information processing device 10 can sign in to the authentication server 14 and can access the file provider server 12 freely without installing the latest second system software so long as the latest first system software is installed.

The patch file provider server 12b is managed by the management entity of the virtual game shop online, and stores patch files applied to the game software. A patch file is used to correct bugs of a game program recorded in a ROM medium or an installed game program, or modify or add a function. When a game manufacturer crates a patch file for game software, the game manufacturer supplies the file to the management entity of the virtual game shop along with version information. The management entity causes the patch file provider server 12b to store the patch file and the version information so that the information processing device 10 can download the patch file.

The content file provider server 12c is managed by the provider of game software (for example, game manufacturer), and stores content files such as demonstration games and game trailers to recommend games. The content file provider server 12c offers a trial version, game video, etc. of a newly released game to the user free of charge for the purpose of sales promotion. By downloading a demonstration game or a game trailer from the content file provider server 12c, the user can experience a recommended game and is given an incentive to purchase the game of a release version. Unique content file provider servers 12c may be prepared in different countries or areas so as to provide unique recommended content.

The authentication server 14 registers the authentication information of the information processing device belonging to the information processing system 1, and authenticates the information processing device 10 by comparing the authentication information transmitted from the information processing device 10 with the registered authentication information. The authentication server 14 maintains the latest version information of the system software that can be provided from the system software provider server 12a, and compares the maintained information with the version information of system software transmitted from the information processing device 10. If, as a result of the comparison, the version of the system software installed in the information processing device 10 is found to be older than the version of the latest first system software, authentication is refused. The information processing device 10 can access the file provider server 12 freely by being authenticated by the authentication server 14.

The information processing device 10 according to the embodiment performs automatic download processing. Automatic download processing is initiated by a timer and is performed without requiring user operation. In order to perform automatic download processing according to this embodiment, the user initially sets up an automatic login function and an automatic sign-in function in the information processing device 10.

The automatic login function is a function for logging in to the information processing device 10 automatically using the user account registered in advance, when the information processing device 10 is started. The automatic sign-in function is a function of transmitting, after log-in, authentication information (sign-in ID and password) registered in advance for the user logging in to the information processing device 10 to the authentication server 14, and automatically signing in to the service provided by the file provider server 12 on the network 18. By setting up the automatic login function and the automatic sign-in function in the information processing device 10, the user makes available an environment in which the information processing device 10 can sign in to the service automatically and execute the automatic download function when the device 10 is turned on triggered by a timer.

In this environment, the information processing device 10 is started by the system controller when a preset time has come, namely, a power supply is placed in an on-state from an off-state. The information processing device 10 performs an automatic login process and an automatic sign-in process. The information processing device 10 starts a download module, and, upon completion of sign-in, transmits an account ID of the download service and identification information (console ID) of the information processing device 10 to the authentication server 14. The authentication server 14 registers the identification information of the information processing device of the user subscribing to the download service and the service account ID of the user. The server 14 checks the identification information and the service account ID transmitted from the information processing device 10 against the registered identification information and service account ID and determines whether to permit automatic download processing. In this process, the authentication server 14 also checks the expiration date of the service account ID. The authentication server 14 notifies the information processing device 10 of the result of determination. Although determination of authentication for sign-in and determination on permission of automatic download processing may be performed by a single authentication server 14, they may be performed by the separate authentication servers.

The sign-in ID may be used as the service account ID. In this case, the information processing device 10 transmits a console ID to the authentication server 14 upon completion of sign-in. The sign-in ID already authenticated need not be transmitted. The authentication server 14 registers the console ID, mapping the console ID to the user's sign-in ID. The server 14 determines on the validity of the sign-in ID mapped into the received console ID, i.e., determines whether automatic download processing is permitted, and communicates the result of determination to the information processing device 10.

When a determination result indicating permission of the execution of automatic download processing is received from the authentication server 14, the information processing device 10 determines the file to be downloaded, and downloads the file automatically from a server in the file provider server 12. The user can obtain a required or useful file automatically, without manually selecting a file requested to be downloaded, by joining the automatic download service provided by the information processing system 1.

Automatic download processing shown in this embodiment is applicable not only to the information processing device 10 that runs game software but information processing devices that run accounting software, CAD software, etc. The information processing device 10 may be a stationary terminal or may be a portable terminal.

Figure 2:
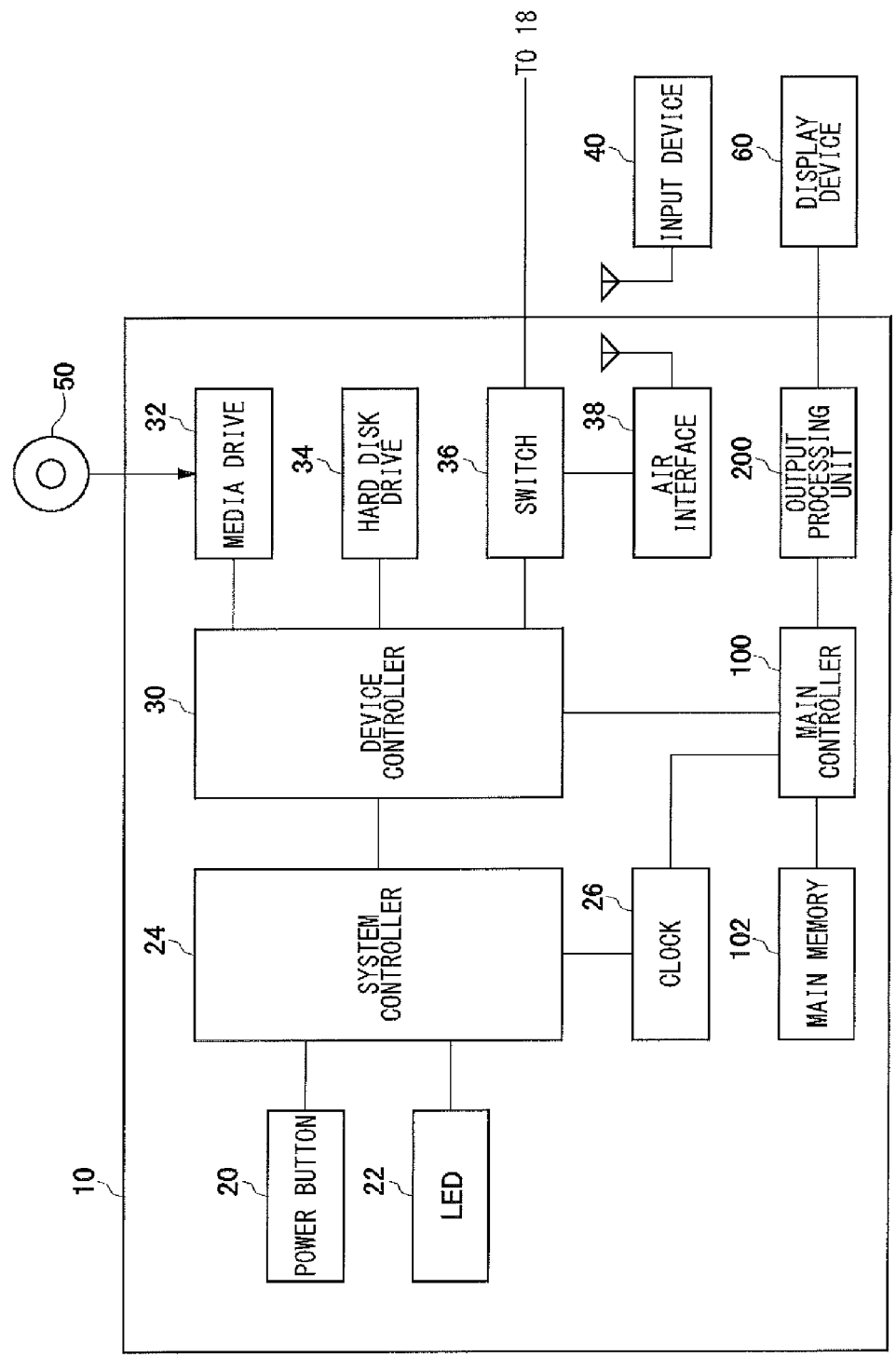
FIG. 2 is a functional block diagram of the information processing device.

FIG. 2 is a functional block diagram of the information processing device 10. The information processing device 10 comprises a power button 20, an LED 22, a system controller 24, a clock 26, a device controller 30, a media drive 32, a hard disk drive 34, a switch 36, an air interface 38, a main controller 100, a main memory 102, and an output processing unit 200.

The power button 20 is an input unit where a user input is provided. The button is operated to turn the power supply to the information processing device 10 on or off. The LED 22 is turned on or off to indicate whether the power is turned on or off. The system controller 24 detects the pressed state or the non-pressed state of the power button 20. Upon detecting transition from the power-off-state to the pressed state, the controller 24 activates the main controller 100 and turns the LED 22 on. When a power cable is connected to the information processing device 10, the system controller 24 maintains the standby mode even in the power-off-state and monitors whether the power button 20 is pressed. The clock 26 is a realtime clock and generates current date and time, supplying them to the system controller 24 and the main controller 100.

Like a south bridge, the device controller 30 is configured as a large-scale integrated circuit (LSI) for executing the delivery of information between devices. As illustrated, the system controller 24, the media drive 32, the hard disk drive 34, the switch 36, and the main controller 100 are connected to the device controller 30. The device controller 30 controls the timing of data transfer, canceling differences in electrical property of the devices or differences in data transfer rates thereof.

The media drive 32 drives a ROM 50 storing game software and mounted thereon so as to read a game program or game data from the ROM medium 50. The ROM medium 50 is a read-only recording medium such as an optical disk, magneto-optical disk, or blue ray disk.

The game software includes, for example, a main program for executing the game application, a startup file for starting the main program, game data such as game characters and scenario, title ID of the game software, version information of the game software, etc.

The main program is a program required for the execution of an application. By executing the main program, the game advances accordingly. The startup file is a program for starting the main program. By executing the startup file, the main program is called and executed.

The hard disk drive 34 is an auxiliary storage device that drives a built-in hard disk so as to write and read data using a magnetic head. The switch 36 is an Ethernet (registered trademark) switch and is a device connected wirelessly or by cable to an external device for transmission and reception of information. In this embodiment, a cable is connected to the switch 36, communicably connecting the switch 36 to the network 18. The switch 36 is connected to the air interface 38. The air interface 38 is connected to an input device 40 provided with the function of communicating wirelessly using a communication protocol such as the Bluetooth protocol (registered trademark) or the IEEE802.11 protocol. The input device 40 is an input means where a user input is provided.

The main controller 100 is provided with a multicore CPU. One general-purpose processor core and a plurality of simple processor cores are provided in a single CPU. The general-purpose processor core is referred to as a power processing unit (PPU) and the other processor cores are referred to as synergistic-processing units (SPU).

The main controller 100 is provided with a memory controller connected to the main memory 102 that is a main storage device. The PPU is provided with a register and a main processor as an entity of execution. The PPU efficiently allocates tasks as basic units of processing in applications to the respective SPUs. The PPU itself may execute a task. The SPU is provided with a register, a subprocessor as an entity of execution, and a local memory as a local storage area. The SPU is provided with a dedicated direct memory access (DMA) controller as a control unit. By performing data transfer between the main memory 102 and the local memory, a stream of data can be processed at a high speed, and high-speed data transfer is achieved between a frame memory built in the output processing unit 200 and the local memory.

The output processing unit 200 is connected to the display device 60 and outputs a video signal and an audio signal resulting from executing the application. The output processing unit 200 is provided with a graphics processing unit (GPU) that implements image processing functions. High definition multimedia interface (HDMI) is employed in the GPU so that the GPU is capable of outputting the video signal in the digital format.

Figure 3:
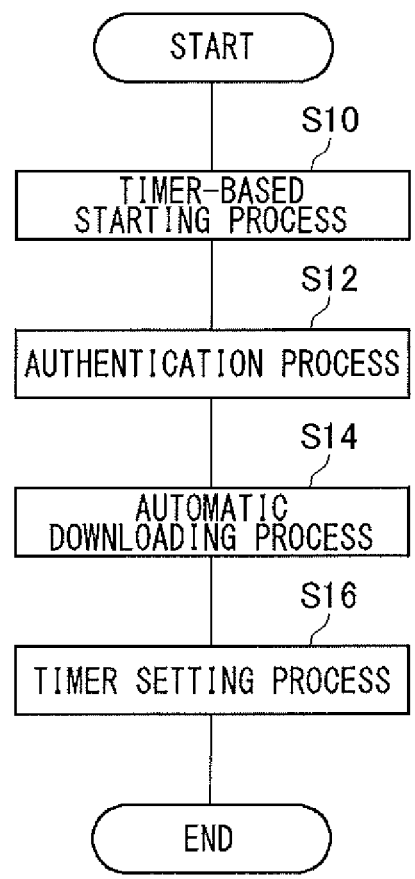
FIG. 3 is a flowchart showing a basic process of automatic download function performed by the information processing device.

FIG. 3 is a flowchart showing a basic process of automatic download function performed by the information processing device 10. Referring to the flowchart shown in FIG. 3, the steps in the respective components are denoted by a combination of S (initial letter of Step), which indicates "step", and a numeral. When a determination is made in a step denoted by a combination of S and a numeral in the flowchart of this specification and when the result of determination is affirmative, Y (initial letter of Yes) is used to indicate the affirmative determination (e.g., Y in S10). Conversely, when the result of determination is negative, N (initial letter of No) is used to indicate the negative determination (e.g., N in S10).

The information processing device 10 in a power-off-state is started at a preset time and starts a download module (S10). The information processing device 10 is provided with the function of executing automatic login and automatic sign-in, so that, when the information processing device 10 is started, automatic login and automatic sign-in are executed. The authentication server 14 determines whether the request for sign-in is accepted. If the sign-in is successful, the information processing device 10 transmits the service account ID to the authentication server 14, and the authentication server 14 determines the validity of the service account ID (S12). Determination as to whether the sign-in is permitted and determination on the validity of the service account ID may be made by separate authentication servers. When it is determined that the service account ID is valid, the information processing device 10 executes automatic download processing (S14). When automatic download processing is completed, the information processing device 10 sets a subsequent date and a subsequent time to start the download module (S16). The timer is set according to the situation occurring before or after starting the download module; therefore the timer may be set immediately after S10. A description will now be given of the process to implement automatic download processing.

<Timer Process>

Figures 4, 5:
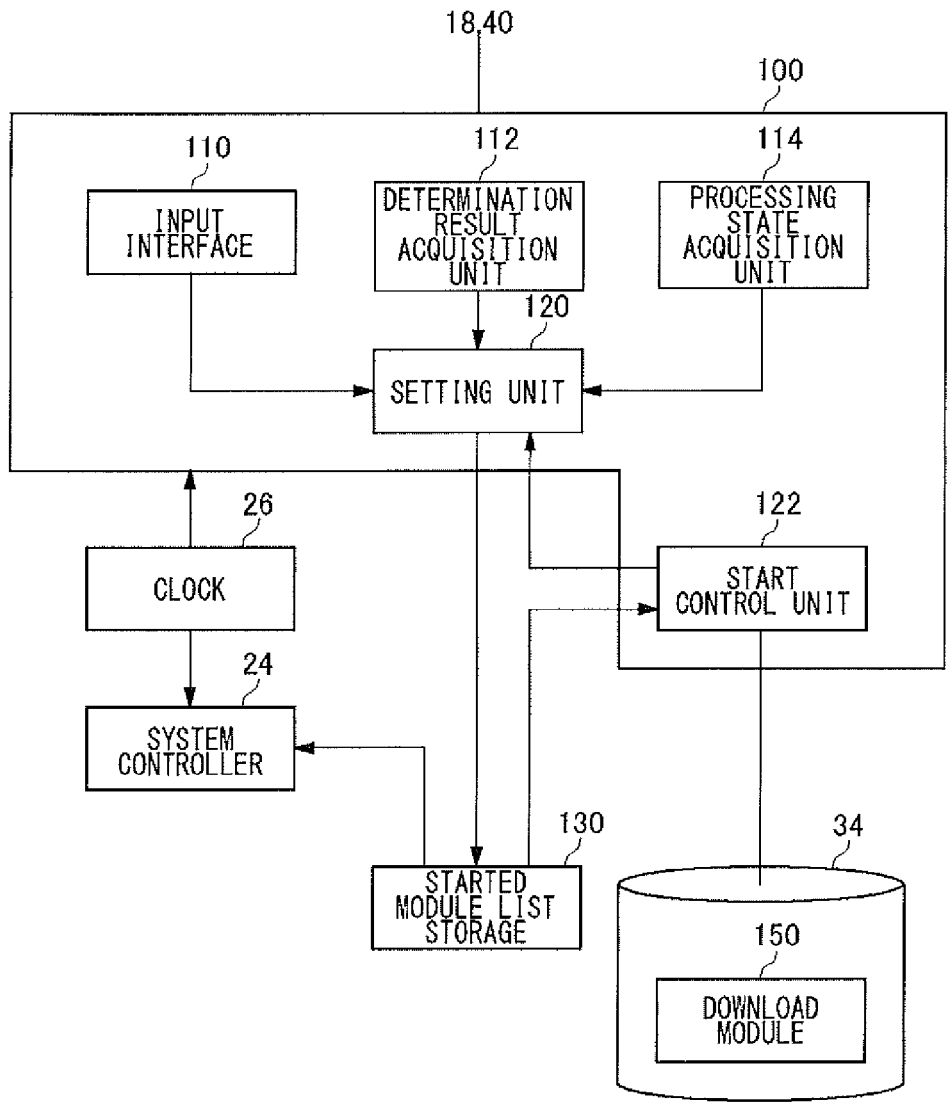
FIG. 4 shows functional blocks for implementing the timer process in the information processing device.
FIG. 5 shows an example of the started module list.

FIG. 4 shows functional blocks for implementing the timer process in the information processing device 10. The timer process includes a timer-based starting process and a timer setting process, which are shown in FIG. 3. The main controller 100 is provided with an input interface 110, a determination result acquisition unit 112, a processing state acquisition unit 114, a setting unit 120, and a start-control unit 122. The determination result acquisition unit 112 and the processing state acquisition unit 114 are used in setting the timer and are implemented by starting the download module 150. The started module list storage 130 comprises, for example, a flash memory and maintains a list of modules (applications) started by being triggered by the timer. While the power supply of the information processing device 10 is in an off-state, the system controller 24 starts the information processing device 10 when triggered by the timer, based on current date and time information.

The elements depicted in FIG. 4. as functional blocks for performing various processes are implemented by hardware such as a central processing unit (CPU), memory, or other LSI's, and by software such as a programs etc., loaded into the memory. As mentioned already, one PPU and a plurality of SPUs are provided in the main controller 100, and the PPU and the SPU can embody the functional blocks independently or cooperatively. Therefore, it will be obvious to those skilled in the art that the functional blocks may be implemented in a variety of manners by hardware only, software only, or a combination of thereof.

In advance of the timer process, the input interface 110 receives an input of starting time of the download module 150 from the user. When the user uses the input device 40 to input the starting time, the input interface 110 receives the starting time and supplies it to the setting unit 120. The starting time thus received does not specify the day. The user sets the time to start automatic download processing at, for example, midnight time (2:00). The setting unit 120 sets a date and a time to start download module 150, when the starting time is received. The date and the time of starting specify the day. For example, when the starting time is supplied to the setting unit 120 from the input interface 110, the unit 120 sets the starting time of the next day, and writes the subsequent date and the subsequent time in the started module list stored in the started module list storage 130. When the user does not input the starting time, the setting unit 120 uses the default starting time (for example, 4:00), sets the starting date and time, and writes it in a started module list.

FIG. 5 shows an example of the started module list. The started module list stores the starting date and time and the started modules in association with each other. Having set the starting date and time of the download module 150, the setting unit 120 writes the date and the time in the started module list.

The system controller 24 monitors the power supply state of the information processing device 10. The system controller 24 refers to the started module list maintained in the started module list storage 130 and determines whether the information processing device 10 should be started based on the current date and the current time information supplied from the clock 26. In the example shown in FIG. 5, when the current date and time is 2:00 on Jun. 11, 2010, the system controller 24 turns the power supply of the information processing device 10 on if the power supply of the information processing device 10 was in the off-state, thereby starting the main controller 100 accordingly.

The start-control unit 122 refers to the started module list maintained in the started module list storage 130 and starts a module based on the current date and time information. After the information processing device 10 is started, the start-control unit 122 starts a module at the starting date and time preset in the started module list. In the example shown in FIG. 5, the start-control unit 122 reads the download module 150 from the hard disk drive 34 and starts the module accordingly. This will start the download module 150 and activates automatic download function in the information processing device 10. When the download module 150 is started, the setting unit 120 deletes the corresponding setting information from the started module list. The timer-based starting process is performed as described above.

In the timer setting process, the setting unit 120 sets the subsequent (next) starting date and time of the download module 150 according to the situation occurring before or after starting the download module 150 by the start-control unit 122. In this embodiment, when the power supply of the information processing device 10 is already in the on-state before the download module 150 is started, the setting unit 120 sets the subsequent starting date and time at a date and a time after an interval of certain days (first predetermined days). A determination as to whether the information processing device 10 is already in the on-state is made at the starting date and time set in the started module list or immediately before. For example, the first predetermined days may be one day. In this case, the setting unit 120 sets the subsequent starting date and time at a starting time of the next day. Automatic download processing according to the embodiment may be followed by installation of the downloaded file and so is preferably performed while the user is not playing the game. Since it is likely that the user is playing the game or about to play the game when the power supply of the information processing device 10 is in the on-state, priority is given to game play and automatic download processing is prevented from being executed from the viewpoint of processing load. It is therefore preferable for the setting unit 120 to set the subsequent starting date and time of the download module 150 as early as possible (e.g., the next day) and stand by for another opportunity for automatic download processing.

The setting unit 120 may determine whether to set the subsequent starting date and time of the download module 150 depending on the situation occurring before or after starting the download module 150. If the subsequent starting date and time is not set by the setting unit 120, automatic download processing is not performed unless the user manually configures the information processing unit 10 to start the download module 150.

For example, when the execution condition of the download module 150 is not fulfilled after starting the download module 150, the setting unit 120 does not set the subsequent starting date and time of the download module 150. If the execution condition of the download module 150 is not fulfilled, it is plausible that the download module 150 cannot be executed not only at the moment but also in the future. Therefore, the setting unit 120 does not set the subsequent starting date and time. The execution condition of the download module 150 is fulfilled when the fact, that the information processing device 10 is permitted to use a predetermined service by executing the download module, is registered in the authentication server 14. More specification, the condition is fulfilled when the service account ID transmitted from the information processing device 10 to the authentication server 14 is valid. The validity of the service account ID is determined by checking the ID against the service account ID registered in the authentication server 14, and by determining whether the term of validity of the ID has not expired. The determination result acquisition unit 112 acquires the result of determination on the module execution condition, i.e., the result of determination on the validity of the service account ID, from the authentication server 14. When the determination result acquisition unit 112 acquires the determination result indicating that the service account ID is not valid, the setting unit 120 does not set the subsequent starting date and time in accordance with the determination result. Naturally, automatic download processing is not performed in this case, and the download module 150 is terminated.

When the determination result acquisition unit 112 acquires the determination result indicating that the service account ID is valid, the download module 150 executes automatic download processing. If the power supply of the information processing device 10 is in the off-state before the download module 150 is started, and if the start-control unit 122 starts the information processing device 10 before starting the download module 15, the setting unit 120 sets the subsequent starting date and time at a date and time after an interval of certain days (second predetermined days). The second predetermined days may be longer than the first predetermined days and may be, for example, two days. In this case, the setting unit 120 sets the subsequent starting date and time at a time of the day after next. The requirement for the second predetermined days is that it is equal to or longer than the first predetermined days.

In the information processing device 1, time limit is imposed on automatic download processing in accordance with a policy requiring that it is not favorable to continue automatic download processing for a long period of time. For example, the time limit may be three hours. After an elapse of three hours since the starting time, automatic download processing is discontinued upon completion of the process currently in progress. The download module 150 determines the file to be downloaded from the file provider server 12 and then downloads the file thus determined. If the downloaded file is software, the module 150 installs the software (details will be given later). In other words, the download module 150 determines a process, including the installation process, scheduled to be executed before downloading the file. However, the scheduled process may not be completed within the established time limit due to the traffic in the network 18 or the load on the file provider server 12.

The processing state acquisition unit 114 acquires the state of executing a scheduled process. For example, when all the scheduled processes are completed, the processing state acquisition unit 114 acquires information indicating that the scheduled processes are completed at that point of time. Meanwhile, when a scheduled process is not completed within the time limit, the processing state acquisition unit 114 acquires information indicating that the scheduled process is not completed. The information may be represented as a flag value. When the executed situation of the scheduled process is confirmed and the processing state acquisition unit 114 acquires the confirmed processing state, unit 114 supplies the state to the setting unit 120. When the scheduled process is not completed, the setting unit 120 sets the subsequent starting date and time at a date and a time after an interval of the first predetermined days. The setting unit may designate the next day as the subsequent starting date so that the download module 150 can execute the remaining process the next day. When the scheduled process is completed, the setting unit 120 sets the subsequent starting date and time at a date and time after an interval of the second predetermined days as normally done.

Figure 6:
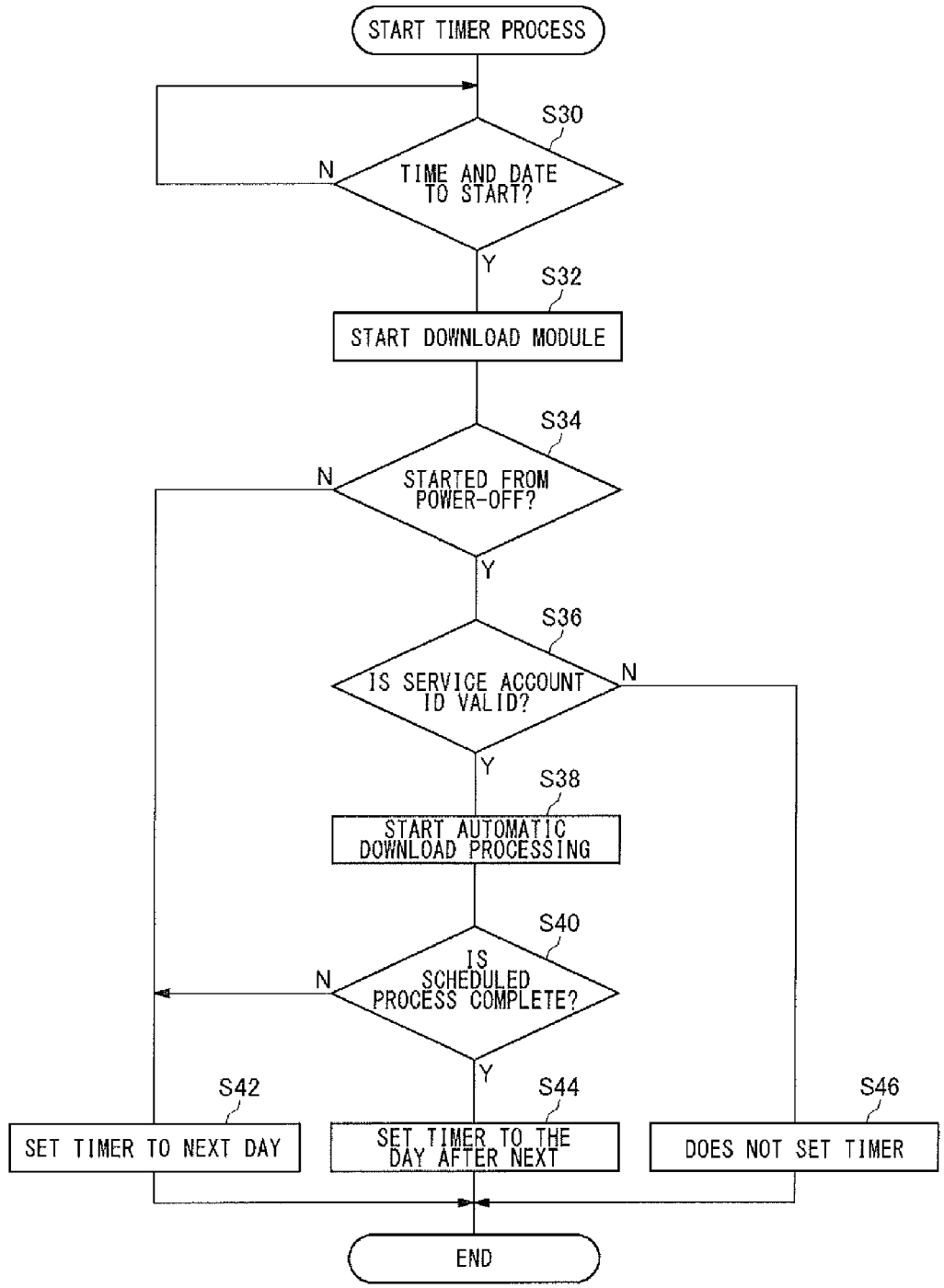
FIG. 6 is a flowchart of the timer process.

FIG. 6 is a flowchart of the timer process. The start-control unit 122 monitors whether the current date and time is the starting date and time set in the started module list (N in S30), and, when the starting date and time arrives (Y in S30), the unit 122 starts the download module 150 (S32). The system controller 24 notifies the start-control unit 122 of the state of the power supply of the information processing device 10 occurring before starting the download module, and the start-control unit 122 supplies the state information on the power supply to the setting unit 120 (S34). The system controller 24 may communicate the state of the power supply of the information processing device 10 occurring before starting the download module directly to the setting unit 120. When the power supply is already in the on-state before the download module 150 is started (N in S34), the setting unit 120 sets subsequent starting date and time at a time during the next day (S42). The download module 150 is terminated without executing automatic download processing.

On the other hand, when the power supply is in the off-state before the download module 150 is started (Y in S34), the information processing device 10 signs into the authentication server 14 and then transmits the service account ID and the console ID thereto. The authentication server 14 checks the service account ID and the console ID against the service account ID and the console ID as registered, and the determination result acquisition unit 112 acquires a determination result (S36). When the determination result indicates that the service account ID is not valid (N in S36), the setting unit 120 does not set the subsequent starting date and time (S46). The download module 150 is terminated without executing automatic download processing.

When the determination result indicates that the service account ID is valid (Y in S36), the download module 150 starts automatic download processing (S38). When the scheduled process is completed within the time limit (Y in S40), the setting unit 120 sets the subsequent starting date and time at a time during the day after next (S44). When the scheduled process is not completed within the time limit (N in S40), the setting unit 120 sets the subsequent starting date and time at a time during the next day (S42).

<Automatic Download Process>

Figure 7:
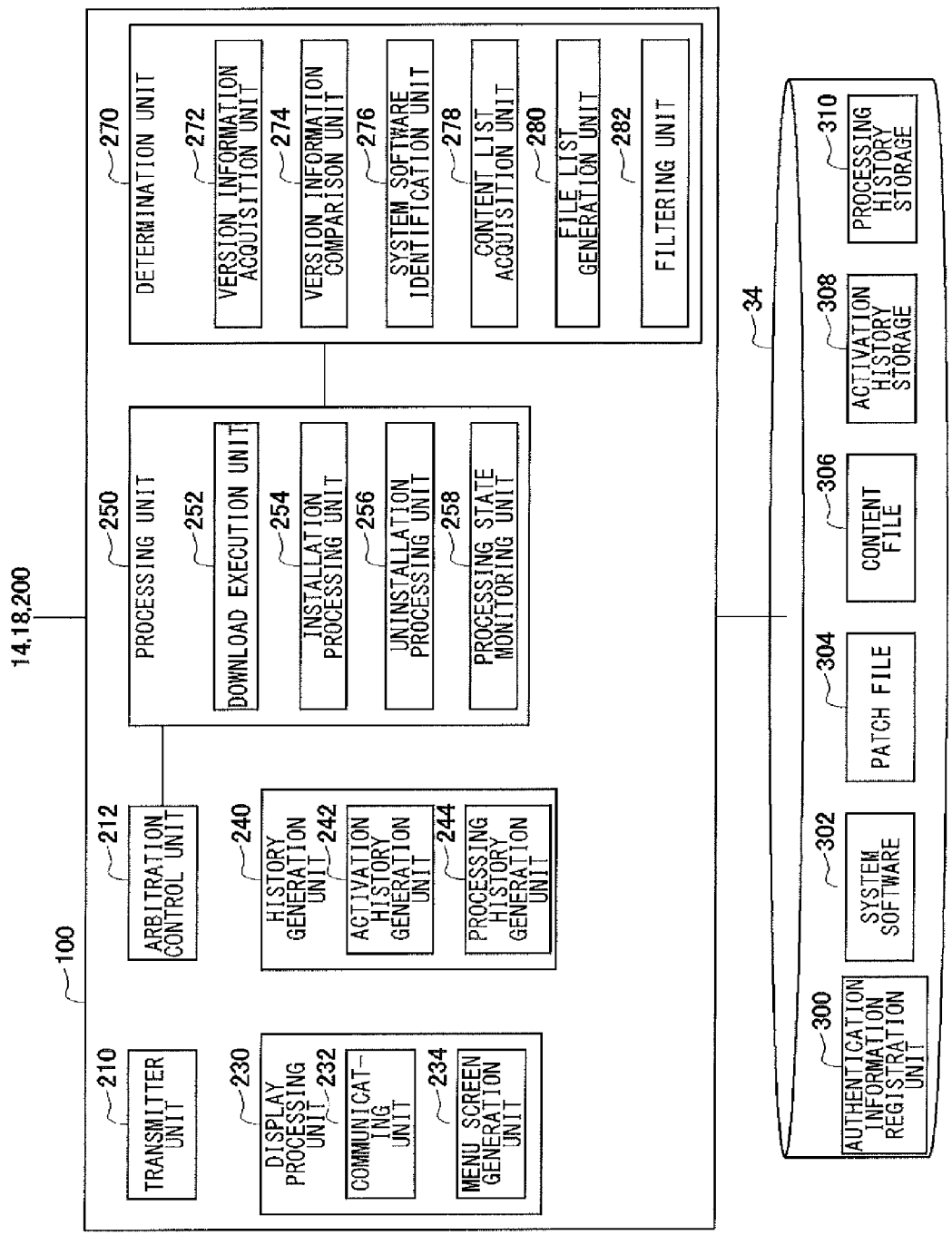
FIG. 7 shows functional blocks for implementing automatic download processing in the information processing device.

FIG. 7 shows functional blocks for implementing automatic download processing in the information processing device 10. The main controller 100 is provided with a transmitter unit 210, an arbitration control unit 212, a display processing unit 230, a history generation unit 240, a processing unit 250, and a determination unit 270. The display processing unit 230 comprises a communicating unit 232 and a menu screen generation unit 234. The history generation unit 240 comprises an activation history generation unit 242 and a processing history generation unit 244.

The authentication information registration unit 300 registers and maintains authentication information. The prerequisite for automatic download processing according to this embodiment is that authentication processing is executed in three stages. In the first stage, the login ID is authenticated in the information processing device 10. In the second stage, the sign-in ID and the sign-in password are authenticated in the authentication server 14. In the third stage, the console ID and the service account ID are authenticated in the authentication server 14. As mentioned already, when the sign-in ID also serves as the service account ID, the validity of the sign-in ID registered in association with the console ID is determined in the third stage in the authentication server 14. The authentication information registration unit 300 maintains the authentication information (ID and password) authenticated in each stage.

An activation history storage 308 stores a history of starting (activating) the game that the user played in the past. An activation history is generated by mapping the identification information (title ID) identifying game software into the latest activation (starting) date and time of the game software. The activation history is generated by mapping the title ID into the version information identifying the version of the patch file already downloaded. That is, the activation history includes the title ID and the version information identifying the version of the patch file already downloaded in association with each other. Therefore, the activation history includes the title ID of game software, the latest starting date and time, and the version information of the downloaded patch in association with each other.

The processing history storage 310 stores a processing history of the installed content file. The processing history is created for the installed demonstration game. Specifically, the processing history includes the identification information (title ID) identifying a demonstration game, the flag information indicating that the game is downloaded by automatic download processing, the installed date and time information, and the number of times that the game is played in association with each other.

The elements depicted in FIG. 7. as functional blocks for performing various processes are implemented by hardware such as a central processing unit (CPU), memory, or other LSI's, and by software such as a programs etc., loaded into the memory. As mentioned already, one PPU and a plurality of SPUs are provided in the main controller 100, and the PPU and the SPU can embody the functional blocks independently or cooperatively. Therefore, it will be obvious to those skilled in the art that the functional blocks may be implemented in a variety of manners by hardware only, software only, or a combination of thereof.

When started, the information processing device 10 according to the embodiment executes automatic login and automatic sign-in. After automatic login, the transmitter unit 210 reads the authentication information (sign-in ID and sign-in password) registered in the authentication information registration unit 300, and transmits the information to the authentication server 14 via the switch 36, along with the version information of the installed system software.

When the authentication server 14 receives the authentication information and the version information of system software, the server 14 compares the received authentication information with the authentication information currently maintained. If the information matches, the device is ready to sign in to the server. If the system software installed in the information processing device 10 is capable of using the network function, authentication by the authentication server 14 is acknowledged and automatic sign-in is completed.

Meanwhile, if the installed system software cannot use the network function, authentication is denied by the authentication server 14 so that the information processing device 10 cannot sign in to service. In this case, the download execution unit 252 downloads the latest system software automatically from the system software provider server 12a.

Upon completion of an automatic sign-in process, the transmitter unit 210 reads the authentication information (console ID and service account ID) registered in the authentication information registration unit 300, and transmits the information to the authentication server 14 via the switch 36. Upon receiving the authentication information, the authentication server 14 compares the received authentication information with the authentication information currently maintained. The authentication server 14 also checks the expiration date of the service account ID. If the authentication information matches, and if the use of the service account ID is within the expiration date, the authentication server 14 issues permission to execute automatic download processing to the information processing device 10. On the other hand, if the authentication information does not match or the expiration date of the service account ID has passed, the server 14 issues a command to terminate automatic download processing. The information processing device 10 can execute automatic download processing by receiving the permission for execution.

The determination unit 270 comprises a version information acquisition unit 272, a version information comparison unit 274, a system software identification unit 276, a content list acquisition unit 278, a file list generation unit 280, and a filtering unit 282. The unit 270 executes the function of determining a file to be downloaded from the file provider server 12 after the authentication process by the authentication server 14. The processing unit 250 comprises a download execution unit 252, an installation processing unit 254, an uninstallation processing unit 256, and a processing state monitoring unit 258, and executes the function of downloading the file determined by the determination unit 270 from the file provider server 12 and installing the file.

In automatic download processing, the version information acquisition unit 272 acquires the version information of the latest system software from the system software provider server 12a. The version information of the system software 302 already downloaded is recorded in the hard disk drive 34. The version information comparison unit 274 compares the acquired version information with the version information of the system software 302 already downloaded.

The information processing device 10 is configured not to install the downloaded system software 302 if there is no approval from the user. That is, even if the latest system software 302 is downloaded in the past by automatic download processing, the software is not installed without the user's approval. On the other hand, if the latest system software 302 has already been downloaded, it is not necessary to download the system software 302 again. In this regard, the version information comparison unit 274 compares the version information of the downloaded system software 302, instead of the version information of the installed system software, with the version information acquired from the system provider server 12a, so as to determine whether the latest software maintained in the system software provider server 12a has been downloaded.

If the version information comparison unit 274 determines that the latest system software 302 has been downloaded, the system software is not downloaded. On the other hand, if the version information comparison unit 274 determines that the version information acquired from the system software provider server 12a is newer, the system software identification unit 276 sets the acquired version information as the version information of the system software that should be downloaded. The system software identification unit 276 delivers the version information of the system software thus set to the download execution unit 252 so that the download execution unit 252 downloads the system software of the latest version from the system software provider server 12a. As mentioned already, the downloaded system software is not installed automatically, and the approval of the user is needed for installation processing. The process of downloaded the system software is as described above.

Subsequently, the uninstallation processing unit 256 uninstalls the content file installed in the past, and, more specifically, the demonstration game software. The processing history storage 310 maintains the processing history of the installed demonstration game software. The processing history storage 310 maintains the past processing information of all game software installed. The uninstallation processing unit 256 refers to flag information found in a plurality of processing histories and indicating that that game software is downloaded by automatic download processing, so as to identify the processing information of the demonstration game software.

FIG. 8 shows an example of processing history maintained in the processing history storage 310. The processing history is created by mapping the identification information (title ID) identifying the game software, the flag value indicating whether the game software is downloaded by automatic download processing, the date and time that the game software is installed, and the number of times that the game is played. The flag value "1" indicates that the game software is downloaded by automatic download processing, and the flag value "0" indicates that the game software is installed by manual download processing. The installed date and time indicates the date and time that the game software is installed in the information processing device 10. The number of times of play indicates that the number of times that the game is played by the user after installation. The processing history generation unit 244 generates a processing history when the game software is installed, and updates the number of times of a play when the game is played.

The uninstallation processing unit 256 uninstalls the installed game software by referring to the process information indicated in the processing history. Specifically, the uninstallation processing unit 256 uninstalls the game software for which the flag value is set to "1", the number of times of play is 0, and a predetermined period of time has elapsed now since the installation date and time. The predetermined period of time may be set to, for example, one month. One can predict, from the fact that the demonstration game installed by automatic download processing has not been played for one month, that the user will not play the demonstration game in the future. Leaving an unnecessary demonstration game installed in the hard disk drive 34 is wasteful use of storage capacity. Therefore, the uninstallation processing unit 256 uninstalls such a demonstration game. Thereby, the storage capacity of the hard disk drive 34 can be efficiently used. The uninstallation process by the uninstallation processing unit 256 is preferable carried out before the execution of download processing by the download execution unit 252 (described below). This allows an unnecessary game to be deleted and increases the storage capacity before download processing.

The uninstallation processing unit 256 may delete not only a game but a game trailer from the hard disk drive 34. In this case, the processing history storage 310 creates a processing history mapping the identification information identifying the game trailer, the flag value indicating whether the game trailer is downloaded by automatic download processing, the date and time of downloading, and the number of times of playback. The number of times of playback represents the number of times that the game trailer is played back by the user. The uninstallation processing unit 256 uninstalls the game trailer for which the flag value is set to "1", the number of times of playback is 0, and a predetermined period of time has elapsed now since the date and time of downloading.

After completion of the uninstallation process, the file list generation unit 280 determines application related files to be downloaded from the file provider server 12. The application related files include a patch file provided by the patch provider server 12b and a content file provided by the content file provider server 12c, and do not include system software not related to an application. The file list generation unit 280 determines related files to be downloaded after the download processing of the system software, i.e., after the version information of the downloaded system software is compared with the version information of the system software stored in the system software provider server 12a by the version information comparison unit 274. The download execution unit 252 downloads the related files thus determined.

Specifically, the file list generation unit 280 determines the related file to be downloaded by referring to the activation history currently maintained in the activation history storage 308. The file list generation unit 280 generates a list of related files to be downloaded. This list is used as a queue scheduled to be downloaded.

FIG. 9 shows an example of activation history maintained in the activation history storage 308. The activation history is created by mapping the identification information (title ID) identifying the game software, the latest activation date and time of the game software, and the version information identifying the version of the patch file already downloaded. The latest activation date and time indicates the date and time that the game software was started last. The patch version information indicates the latest version information of the patch file already downloaded.

The activation history generation unit 242 generates the activation history in which the number of games is limited to a predetermined number, based on the latest activation date and time of games. That is, the activation history can include games within the predetermined upper limit number. For example, the maximum number of games for which the activation history is generated is 32. In this case, the activation history generation unit 242 generates the activation history of a maximum of 32 game titles started in the past. When the activation history of 32 game titles is generated and a new game is started in that state, the activation history of the game title started at the oldest date and time is deleted and replaced by the activation history of the new game title.

When the uninstallation processing unit 256 uninstalls the game software, the activation history generation unit 242 deletes the activation history of the uninstalled game software. The activation history is used by the file list generation unit 280 to select related files to be downloaded. By deleting the activation history of the uninstalled game software, the patch file of the uninstalled game software is prevented from being downloaded. In automatic download processing according to the embodiment, the uninstallation processing unit 256 uninstalls game software automatically by referring to the process information indicated in the processing history. The unit 256 is also provided with the function of uninstalling designated game software in response to a user request. It is preferable for the activation history generation unit 242 to delete the activation history of the game software uninstalled in response to the user request.

The file list generation unit 280 determines patch files to be downloaded by selecting game software within the constraints of a preset upper limit to the number of games. Setting an upper limit to the number of games is for the purpose of completing automatic download processing within a time limit. For example, the upper limit may be three. In other words, the number of games for which patch files is downloaded is three at the maximum. The file list generation unit 280 selects game software and determines a patch file to be downloaded. A plurality of patch files may be downloaded for a single piece of game software. Therefore, the number of patch files to be downloaded may exceed the upper limit number to pieces of game software.

The determination unit 270 refers to the activation history, lists candidates of games for which patch files should be downloaded in reverse-chronological order, and selects the game software in the listed order within the upper limit number. Specifically, the version information acquisition unit 272 refers to the processing history and selects candidates of games for which patch files should be downloaded in the reverse chronological-order of the latest activation date and time. The version information comparison unit 274 verifies whether the patch file that should be downloaded is available in the patch file provider server 12b in accordance with the listed order. If there is any patch file not downloaded yet, the file list generation unit 280 determines the patch file as a target for downloading.

The version information acquisition unit 272 acquires, from the patch file provider server 12b, the latest patch version information of the game title with the latest activation date and time closest to the current date and time. The version information comparison unit 274 compares the acquired latest version information with the patch version information currently recorded in the activation history, and determines whether any patch file not downloaded yet is available in the file provider server 12b. If the patch file is stored in the patch file provider server 12b that is identified as having version information that is newer than the version information currently recorded in the activation history, the file list generation unit 280 determines the patch file as a target for downloading. Meanwhile, if the latest patch file is already downloaded, the version information acquisition unit 272 acquires the latest patch version information of the game title with the latest activation date and time second closest to the current date and time. The version information comparison unit 274 compares the acquired information with the patch version information recorded in the activation history. These steps continue to be repeated. When the file list generation unit 280 has selected the upper limit number of (three) pieces of game software, or when the version information comparison unit 274 has compared the patch version information of all game software, a file list of patch files is created.

When the file list of patch files is completed, the determination unit 270 starts generating a file list of content files. The content list acquisition unit 278 acquires a list of downloadable content files from the content file provider server 12c. A content list includes information such as the title ID of demonstration game software, or the URL indicating the storage destination of a game trailer, etc. The filtering unit 282 refers to the processing history maintained in the processing history storage 310 and excludes certain content from the content list.

FIG. 10 shows an example of processing history maintained in the processing history storage 310. The processing history storage 310 also maintains the processing history shown in FIG. 10 in addition to the processing history shown in FIG. 8. The processing history shown in FIG. 8 and the processing history shown in FIG. 10 may both be generated in a single database. The processing history shown in FIG. 10 includes processing information related to applications and is created by mapping the identification information (title ID) identifying the game software, the flag value indicating whether the game software was downloaded in the past, the flag value indicating whether the product version of the software was installed in the past, and the flag value indicating whether the user played the product version of the software in the past. The processing history is created for demonstration game software.

In the processing history, the "installed" flag value of "1" indicates that the software was installed in the past, and the flag value of "0" indicates that the software was not installed in the past. Indication that the software was installed in the past is made even if the software is currently uninstalled. The "product version is installed" flag of "1" indicates that the production version of software was installed in the past, and the flag value of "0" indicates that the product version of software was not installed in the past. The "product version is played" flag of "1" indicates that the user played the production version of software (e.g., product version of software stored in the ROM medium 50) in the past, and the flag value of "0" indicates that the user has not played the product version of software.

The filtering unit 282 compares the content list with the processing information shown in FIG. 10. If the processing history shows that the flag value of any of the content files included in the content list is set to 1, the unit 282 performs a filtering process of excluding the content file. The unit 282 delivers the result of filtering to the file list generation unit 280. The processing history storage 310 also maintains the URL list indicating the storage destination of game trailers downloaded in the past (not shown). The filtering unit 282 compares the URL included in the content list with the downloaded URL list. If any of the URLs included in the content list is included in the URL list, the unit 282 performs a filtering process of excluding the included URL from the content list and delivers the result of filtering process to the file list generation unit 280.

The file list generation unit 280 determines the content file that fulfills a predetermined condition, i.e., the content file included in the content list surviving the filtering, as a target for downloading. Through these steps, the file list generation unit 280 generates a list identifying the patch files and content files to be downloaded.

The download execution unit 252 downloads the patch file 304 and the content file 306 that are included in the list generated by the file list generation unit 280. By generating a list identifying the files scheduled to be downloaded and then allowing the download execution unit 252 to download the files included in the list collectively, total processing time is reduced. As the download execution unit 252 downloads the patch file 304 included in the list, the activation history generation unit 242 updates the patch version information maintained in the activation history storage 308 with the downloaded patch version information.

Of the downloaded related files, the installation processing unit 254 installs the patch file and the demonstration game software. The installation processing unit 254 installs the downloaded files after the download execution unit 252 has downloaded all of the files included in the list. Even if the installation is not completed within the time limit of, for example, three hours defined for the execution of the download module 150, the installation process alone can continue next time the module 150 is started by completing the downloading of the files.

The arbitration control unit 212 monitors the execution-state of the module in the information processing device 10. The arbitration control unit 212 determines whether a module other than the download module 150 is being executed at the time of completion of download processing by the download execution unit 252. If any other module is being executed, the arbitration control unit 212 halts the installation processing of the downloaded file by the installation processing unit 254. When any other module is started while the installation processing by the installation processing unit 254 is proceeding, the arbitration control unit 212 halts the installation of the subsequent files, when the installation of the current file is completed.

The processing state monitoring unit 258 monitors the situation of the download processing by the download execution unit 252 and the installation processing by the installation processing unit 254. The processing state monitoring unit 258 monitors whether all the scheduled processes are completed within the time limit. When the state of the scheduled process is confirmed, the processing state monitoring unit 258 supplies the processing state to the processing state acquisition unit 114 shown in FIG. 4. Specifically, when the installation processing is complete, the processing state monitoring unit 258 supplies information indicating that all scheduled processes are completed to the processing state acquisition unit 114. On the other hand, when the time limit elapses before the completion of download processing or installation processing, the unit 258 supplies information indicating that the scheduled processes are not completed to the processing state acquisition unit 114. When the download processing is interrupted, the file list generation unit 280 leaves the file for which downloading has not been completed in the list (queue) for file list generation of the next day.

It should be noted that there are two types of patch files 304. A difference patch is a patch containing only the difference from the last patch; therefore, the game software is maintained in the latest state by applying the difference patches of all versions. A cumulative patch is a patch that is substantially a collection of the difference patches of all versions; therefore, the game software is maintained in the latest state by applying one cumulative patch. If the file not yet downloaded includes a difference patch and if a difference patch of a newer version is available for downloading the next day, the file list generation unit 280 includes the difference patch of the newer version in the list. If the file not yet downloaded includes a cumulative patch and if a new cumulative patch is available for downloading the next day, the file list generation unit 280 excludes the cumulative patch not downloaded the previous day and includes the new cumulative patch in the list.

The menu screen generation unit 234 in the information processing device 10 generates a menu screen including a plurality of icon images identifying processes executable in the information processing device 10 in a criss-cross arrangement, and supplies the menu screen to the output processing unit 200. The menu screen generation unit 234 generates a menu screen that displays an image identifying the installed file.

Figure 11:
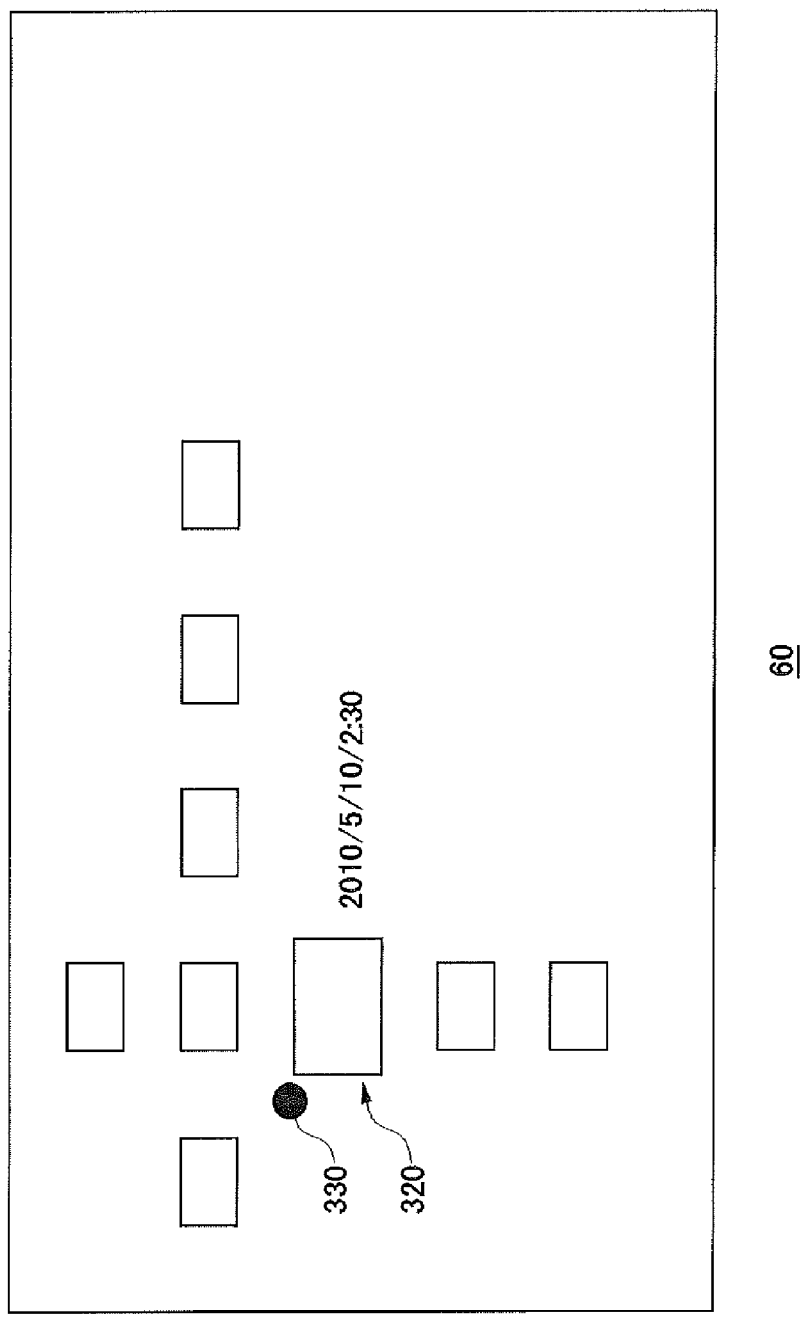
FIG. 11 shows an example of menu screen.

FIG. 11 shows an example of menu screen. The user can make an icon-based selection by using the input device 40 to move a desired icon to a selection area 320 by scrolling. The user can also confirm the selection. Icon-based selection is the movement of an icon to the selection area 320. Confirmation of the selection is the execution of a process associated with the icon by using a button while the icon is located in the selection area 320.

The menu screen generation unit 234 generates a menu screen in which an image identifying a content file installed while the download module 150 is being executed is displayed in a mode different from the standard display mode. In the menu screen shown in FIG. 11, a mark 330 is displayed adjacent to the icon installed by automatic download processing. By displaying the mark 330 adjacent to the icon, the user can recognize that the content file is automatically downloaded. If the user does not play, for example, an automatically downloaded demonstration game for a predetermined period of time (e.g., one month) in the information processing device 10, the demonstration game is automatically uninstalled by the uninstallation processing unit 256. By identifying the mark 330, the user can know that the demonstration game will be automatically uninstalled unless the user plays the game. The menu screen generation unit 234 does not display the mark 330 adjacent to the icon if the demonstration game is played or the game trailer is played back. The menu screen generation unit 234 refers to the processing history stored in the processing history storage 310 shown in FIG. 8 and determines whether to display the mark 330.

A description is given above of a need to set up the automatic sign-in function in order to set up the automatic download function (i.e., to start the download module 150). Therefore, if the authentication information for automatic sign-in is not registered in the authentication information registration unit 300, or if automatic sign-in is not set up, as the user sets up the automatic download processing function in the information processing device 10, the communicating unit 232 notifies the user accordingly. The communication unit 232 generates a message indicating that "automatic sign-in need be set up to benefit from automatic download service" and displays the message on the display device 60 via the output processing unit 200. This will prompt the user to set up automatic sign-in. A similar message is originated if the automatic log-in function is not set up.

When the setting of the automatic sign-in function or automatic login function is canceled while the automatic download processing function is already set up, the automatic download processing function will not be executed. For this reason, if the user cancels the setting of the automatic sign-in function or automatic login function while the automatic download processing function is set up, the communication unit 232 generates a message indicating, for example, that "automatic download service will not be available since the setting of automatic sign-in is canceled" and displays the message on the display device 60 via the output processing unit 200. By allowing the communication unit 232 to originate an alert, a situation is avoided in which automatic download is not performed contrary to the user's intent. The communication unit 232 generates a similar alert when, for example, the authentication information registered in the authentication information registration unit 300 is modified.

Figure 12:
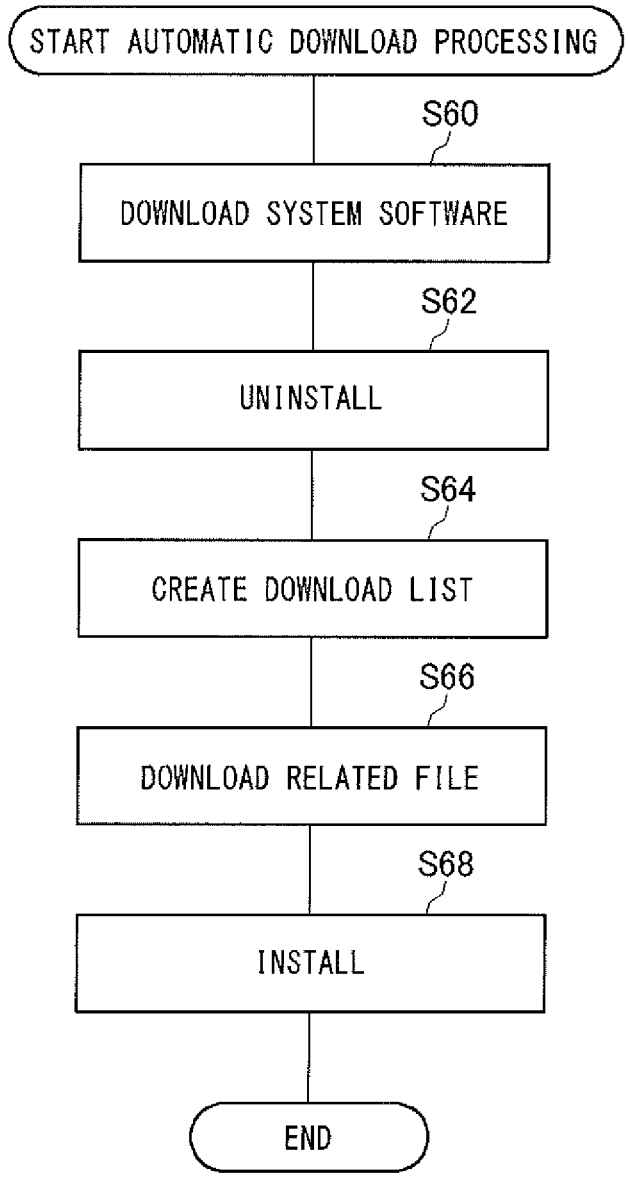
FIG. 12 is a flowchart showing automatic download processing.

FIG. 12 is a flowchart showing automatic download processing. The version information comparison unit 274 compares the latest version information of the system software stored in the system software provider server 12a with the version information of the stem software 302 already downloaded. If the system software stored in the system software provider server 12a is newer, the download execution unit 252 downloads the system software from the system software provider server 12a (S60).

Subsequently, the uninstallation processing unit 256 refers to the process information indicated in the processing history and uninstalls the game software not run for a predetermined period of time after installation (S62). The file list generation unit 280 generates a list of files to be downloaded (S64), and the download execution unit 252 downloads the files included in the list from the file provider server 12 (S66). The installation processing unit 254 installs the downloaded software (S68).

Described above is an explanation based on an exemplary embodiment. The embodiment is intended to be illustrative only and it will be obvious to those skilled in the art that various modifications to constituting elements and processes could be developed and that such modifications are also within the scope of the present invention.

What is claimed is:

1. An information processing device comprising:
 a first storage configured to store an activation history of a plurality of applications;
 a determination unit configured to refer to the activation history and determine a file that is related to an application and that should be downloaded from a server; and
 a processing unit configured to download the determined related file,
 wherein the determination unit determines the related file to be downloaded by selecting one or more applications within an upper limit of a number of the plurality of applications.

2. The information processing device according to claim 1, wherein
 the storage unit stores the activation history that includes identification information identifying an application and the latest activation date and time of the application in association with each other, and
 the determination unit refers to the activation date and time and determines the related file to be downloaded.

3. The information processing device according to claim 1, wherein a number of related files to be downloaded can exceed the upper limit of the number of the plurality of applications.

4. The information processing device according to claim 1, wherein the determination unit lists a plurality of candidate applications for which a plurality of related files are downloaded, in reverse-chronological order of the activation date and time, and selects one or more applications for which related files should be downloaded in the listed order within the upper limit number.

5. The information processing device according to claim 4, wherein the determination unit verifies whether the related file that should be downloaded is available in the server in accordance with the listed order, and, if the related file is found, the determination unit determines the related file as a target for downloading.

6. The information processing device according to claim 1, wherein
 the related file is a patch file of the application,
 the storage unit stores the activation history that includes identification information identifying an application and version information identifying a version of a patch file already downloaded in association with each other, and
 if a patch file is stored in the server that is identified as having version information that is newer than the version information currently recorded in the activation history, the determination unit determines the patch file of the application should be downloaded.

7. The information processing device according to claim 6, wherein, when the processing unit downloads the patch file determined by the determination unit, the version information of the patch file included in the activation history is updated with the version information of the downloaded patch file.

8. The information processing device according to claim 1, further comprising:
 a history generation unit configured to generate the activation history,
 wherein the history generation unit generates the activation history in which a number of applications is limited to a predetermined number, based on the latest activation date and time of applications.

9. The information processing device according to claim 8, wherein, when an application is uninstalled, the history generation unit deletes the activation history of the uninstalled application.

10. The information processing device according to claim 1, further comprising:
 a second storage configured to store processing information related to an application; and
 an acquisition unit configured to acquire a list of downloadable related files from the server,
 wherein the determination unit compares the acquired list with the processing information and determines a related file that fulfills a predetermined condition as a target for downloading.

11. A non-transitory, computer readable recording medium containing a computer program, comprising:
 a module configured to refer to an activation history of a plurality of applications stored in a storage medium and determine a file that is related to an application and that should be downloaded from a server; and
 a module configured to download the determined related file,
 wherein the module configured to refer and determine determines the related file to be downloaded by selecting one or more applications within an upper limit of a number of the plurality of applications.

12. An information processing device comprising:
 a first storage configured to store an activation history of a plurality of applications;
 a determination unit configured to refer to the activation history and determine a file that is related to an application and that should be downloaded from a server; and
 a processing unit configured to download the determined related file, wherein:
 the related file is a patch file of the application,
 the storage unit stores the activation history that includes identification information identifying an application and version information identifying a version of a patch file already downloaded in association with each other, and
 if a patch file is stored in the server that is identified as having version information that is newer than the version information currently recorded in the activation history, the determination unit determines the patch file of the application should be downloaded.

13. The information processing device according to claim 12, wherein, when the processing unit downloads the patch file determined by the determination unit, the version information of the patch file included in the activation history is updated with the version information of the downloaded patch file.

14. The information processing device according to claim 12, further comprising:
 a history generation unit configured to generate the activation history,
 wherein the history generation unit generates the activation history in which a number of applications is limited to a predetermined number, based on the latest activation date and time of applications.

15. The information processing device according to claim 14, wherein, when an application is uninstalled, the history generation unit deletes the activation history of the uninstalled application.

16. The information processing device according to claim 12, further comprising:
  a second storage configured to store processing information related to an application; and
  an acquisition unit configured to acquire a list of downloadable related files from the server,
  wherein the determination unit compares the acquired list with the processing information and determines a related file that fulfills a predetermined condition as a target for downloading.

17. An information processing device comprising:
  a first storage configured to store an activation history of one or more applications;
  a determination unit configured to refer to the activation history and determine a file that is related to an application and that should be downloaded from a server;
  a processing unit configured to download the determined related file;
  a second storage configured to store processing information related to an application; and
  an acquisition unit configured to acquire a list of downloadable related files from the server,
  wherein the determination unit compares the acquired list with the processing information and determines a related file that fulfills a predetermined condition as a target for downloading.

* * * * *